United States Patent
Tomlin et al.

(10) Patent No.: US 9,798,745 B2
(45) Date of Patent: Oct. 24, 2017

(54) METHODS, DEVICES AND SYSTEMS FOR CACHING DATA ITEMS

(71) Applicant: Samsung Electronics Co., Ltd., Gyeonggi-Do (KR)

(72) Inventors: Andy Tomlin, San Jose, CA (US); Justin Jones, Burlingame, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 428 days.

(21) Appl. No.: 14/485,688

(22) Filed: Sep. 13, 2014

(65) Prior Publication Data

US 2016/0077980 A1   Mar. 17, 2016

(51) Int. Cl.
   *G06F 12/14*     (2006.01)
   *G06F 12/08*     (2016.01)
   *G06F 17/30*     (2006.01)

(52) U.S. Cl.
   CPC .............. *G06F 17/30286* (2013.01)

(58) Field of Classification Search
   CPC ............. G06F 12/0891; G06F 12/0871; G06F 17/30286; G06F 2212/62; G06F 2212/1052; G06F 12/1483; G06F 12/0833
   USPC ......................................... 711/118, 135–136
   See application file for complete search history.

(56) References Cited

U.S. PATENT DOCUMENTS

| | | | |
|---|---|---|---|
| 8,595,268 B2 * | 11/2013 | Shoolman | G06F 17/30607 707/793 |
| 9,348,752 B1 * | 5/2016 | Parakh | G06F 12/0802 |
| 9,350,828 B2 * | 5/2016 | Frachtenberg | H04L 69/12 |
| 9,460,526 B1 * | 10/2016 | Fram | H04N 19/40 |

* cited by examiner

*Primary Examiner* — Jasmine Song
(74) *Attorney, Agent, or Firm* — Convergent Law Group LLP

(57) ABSTRACT

A method of storing data items may comprise receiving an uncompressed data item for storage from a client process of a plurality of client processes over a computer network; storing the uncompressed data item; acknowledging storage of the data item to the client process and receiving at least one additional uncompressed data item for storage from the client process or from another one of the plurality of client processes. The stored uncompressed data item may then be compressed and stored. Upon receiving a request for access to the data item from one of the plurality of client processes over the computer network, the compressed data item is decompressed before providing the decompressed data item to the requesting client process over the computer network.

24 Claims, 5 Drawing Sheets

METHODS, DEVICES AND SYSTEMS FOR CACHING DATA ITEMS

BACKGROUND

Embodiments are related to caching key-value data item pairs in memory, such as may be carried out, for example, relative to Memcached operation.

DETAILED DESCRIPTION

Figure 1:
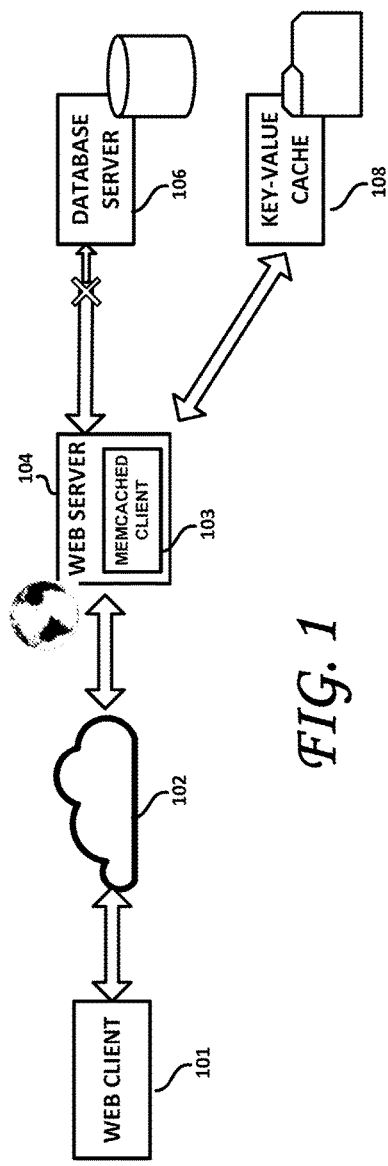
FIG. 1 is a block diagram of a database system.

FIG. 1 is a block diagram of a memcached system. As shown therein, a web client 101 may interact over a computer network 102 (including, for example, the Internet) with a web server 104 to cause an information update. The web server 104 may issue a write to a memcached client 103 and also access the database server 106 to update the database records. Without a key-value cache 108, the web server 104 must directly access the database server 106 for all reads or writes. As the number of application clients and database access requests increase, the generated workload may outpace the ability of the database server 106 to service the access requests. Therefore, to alleviate this bottleneck, a Random Access Memory (RAM) or Flash based key-value store 108 may be provided to reduce the load on the database server 106 and to act as a cache for frequently used data. In this manner, access requests from web clients 101 may be serviced from the key-value cache 108, if the subject information has previously been stored therein. In this configuration, the web server 104 via the memcached client 103 queries the key-value store 108 first and only accesses the database server 106 if the key-value store 108 does not contain the requested data, thereby significantly reducing the load on the database server 106.

Figure 2:
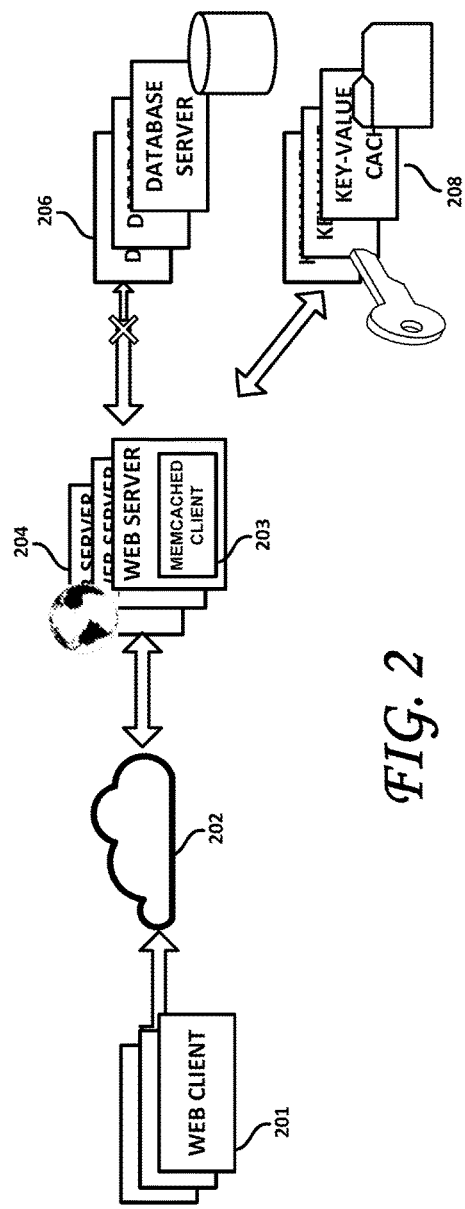
FIG. 2 is another block diagram of a database system.

FIG. 2 is a block diagram of another database system. In real-world applications (such as popular high-volume social networking sites such as Facebook or Twitter, among others), there are many web clients 201 making a great many access requests to a plurality of database server 206 through a plurality of memcached clients 203 within a plurality of web servers 204 over the network 202. That is, a plurality of web clients 201 interact with a plurality of web servers 204 to cause information updates. The web servers 204 issue writes to corresponding memcached clients and access the database servers 206 to update database records. The kind of loads generated by the plurality of memcached clients 203 means that single key-value caches 108 as shown in FIG. 1 are likely unable to service the volume of database access requests. To address this issue, a distributed RAM-based key-value store 208 is used to service the requests from the memcached clients 203 on behalf of web clients 201. The most popular of such distributed RAM or Flash-based key-value store is open source and is called Memcached. Memcached is a set of client and server applications and network Application Program Interfaces (APIs) configured to perform the necessary functions of servicing read and write requests to the distributed database 206. The number of servers running Memcached today runs in the millions.

As introduced above, Memcached is a general-purpose distributed memory caching system. It is often used to speed up dynamic database-driven websites by caching data and objects in RAM to reduce the number of times an external data source (such as a database or API) must be read. When storing large values, say a database result set in the form of an array, care must be exercised not to exceed the value size limit (default limit is 1 MB). To store larger values, the maximum size may be increased or the stored value may be compressed. Conventionally, key-value compression is carried out on the client side (by the Memcached clients 203) at the cost of additional CPU cycles. Enabling compression on the Memcached clients 203 makes efficient use of the in-memory storage, and reduces the amount of data sent over the network to the database servers and to the key-value stores.

While many Memcached clients provide compression services, no compression conventionally happens in the Memcached servers themselves. As alluded to above, client-side compression means that less data is sent over the network. Significantly, client-side compression means that individual compressed cached items are generally of a smaller size than their uncompressed counterparts. Smaller objects will likely be stored more efficiently as they are more likely to fall into smaller-sized memory locations.

Figure 3:
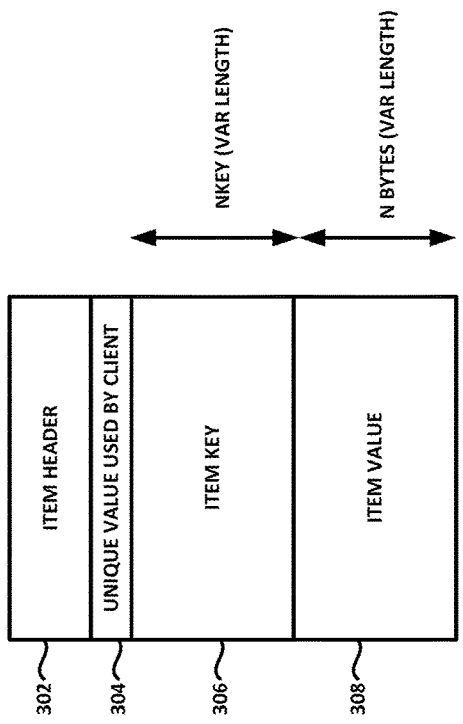
FIG. 3 is a block diagram showing the organization of a cache item.

FIG. 3 is a block diagram, showing the organization of a cache item. As shown, a Memcached item 300 may comprise an item header 302. The item header 302 contains the information that the hardware and the software needs to manage an item. For example, the header 302 may comprise an identification of the next and previous item in the slab, the most recent access time of the item, when the item will expire, the size of the data value 308, any flags associated with the item, the length of the key in bytes, internal flags and an identification of the slab class in which the item is stored. Next, the Memcached item 300 may comprise a Check And Set (or Compare And Swap) identifier 304, abbreviated CAS. The CAS identifier is returned by the CAS command. The CAS command stores data, but only if no one else has updated the data since it was last read. If the item's CAS value 304 has changed since it was last read, it will not be stored. The CAS command, therefore, is useful for resolving race conditions on updating cache data. The CAS identifier, for example, may be a unique 64-bit number used by the Memcached client. The Memcached item 300 may also comprise a hash key 306 associated with the item value 308. The item key may be the size of the actual key; namely, of size nkey in FIG. 3. The item value 308 may be of size nbytes and conventionally is 1 MB in size. In practice, the key may be used to index into a hash table to retrieve the stored value corresponding to the hash key.

Figure 4:
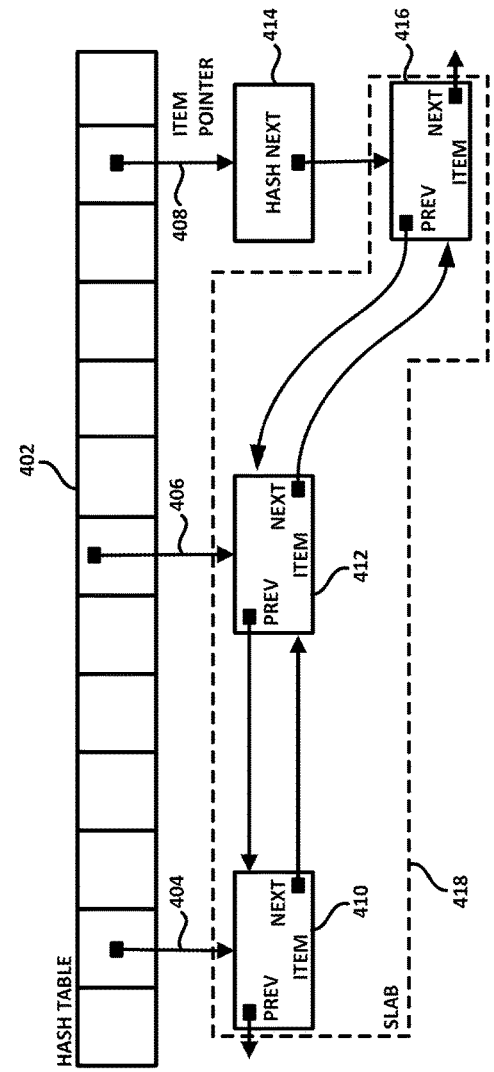
FIG. 4 is a diagram of a hash table and a slab of stored items, such as may be used in one embodiment.

FIG. 4 is a diagram of a hash table and a slab of stored items. As shown, hash table 402 comprises pointers to items, such as shown at 410, 412 and 416. Using hash table 402, to access an item, a key associated with the item is provided and, using the provided key, a hash index is generated into the hash table 402. A pointer to an item is provided at the generated hash index. For example, the generated hash index may be associated with item pointer 408. Pointer 408 points to Hash Next 414 that designates a slab, which is a linked list of items 410, 412 and 416, with each item pointing to the previous and next item in the linked list. The key in 414 is checked is checked to see if it matches the item to be retrieved. If the item 416, pointed to by Hash Next 414, is the item that is to be accessed, then the value of the item pointed to is provided. If not, another item in the linked list (e.g., item 412) is evaluated until the desired item is accessed. Each such linked list, called a slab, comprises items of generally the same size that share the same hash. The previous and next item pointers link a given slab of similar-sized items together in a specific order. For example, the specific order may be the order in which the items were used. Other orders may be implemented. Each slab may comprise a head and a tail pointer. For example, the items in a particular slab of similarly-sized items may be ordered in a Least Recently Used (LRU) order. In such an implementation, as items are accessed, they may be moved to the beginning of an LRU, which is where items that were most recently accessed are stored. The memory location where the item at the tail end of the LRU may be de-allocated by a slab allocator process and thus be made available for another item in the slab. As may be appreciated, pointers (even within a given slab of similarly-sized items) are updated with great frequency, with the attendant computational load on the key-value server. In particular, to safely perform a multi-process, this will require a great deal of locking.

Figure 5:
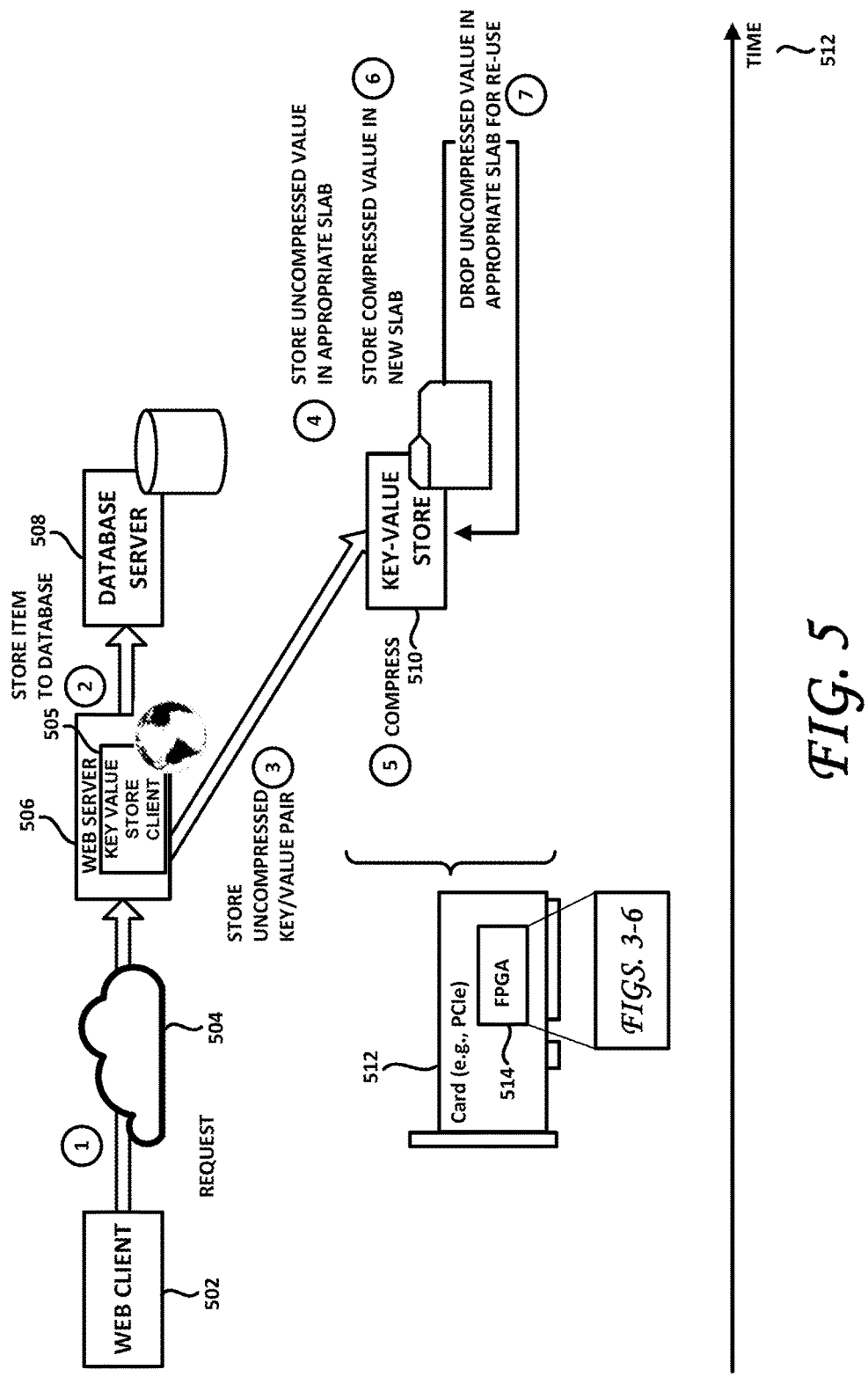
FIG. 5 is a block diagram showing aspects of a system, method and device according to one embodiment.

FIG. 5 is a block diagram showing aspects of a system, device and a method according to one embodiment. As shown at (1), a web client 502 interacts with a web server 506 over a computer network, such as shown at 504. The web server(s) 506 may issue writes to corresponding key-value store client(s) 505 to cause an update of database records in the database server 508. The web server(s) 506 may comprise or host the key-value store client(s) 505. In one implementation, a key-value store client 505 may be or comprise a Memcached client 505, although other implementations are possible, as those of skill may recognize. According to one embodiment, the key-value store client 505 does not compress the value to be written to the database server 508 via the network 504. Rather, according to one embodiment, the item to be written to database server 508 may be sent from the web server(s) 506 to the database server 508 via the key-value store client(s) 505 over the computer network 504, as shown at (2), in an uncompressed (or in the form in which it was received) form. The uncompressed value of the item may then be stored in the database server 508. The uncompressed value of the item, together with an associated key, may also be sent to the key-value store(s) 510, as shown at (3). The uncompressed value of the item may then be stored within the key-value store(s) 510 in a slab that is appropriately-sized for the item value, as shown at (4).

Thereafter, and without a delay attributable to compressing the received item, the key-value store 510 may report to the key-value store client 505 that the item has been safely stored in the key-value pair store 510. Note also that the database server 508 need not wait until the item is sent to the key-value store 510 before acknowledging back to the key-value store client 505. For example, if the database server 508 stores the item to be key-value stored in non-volatile memory within the database server 508, it may report back to the key-value store client 505 as soon as the item is stored in a non-volatile memory or otherwise safe, and need not wait until the item has been sent to the key-value store 510. Thereafter at (5) (which may be long after the uncompressed value is stored in the key-value store 510), the item may be compressed by the key-value store 510 (a server, in one implementation), as shown at (5). The resultant compressed value of the item may then be stored in the key-value store 510, as shown at (6) in a slab storing similarly-sized values as the just-compressed item value, as shown at (6). This slab may be a different slab than the slab in which the uncompressed value was previously stored at (4). Finally, the memory location storing the uncompressed value may be de-allocated. This may be done, for example, by dropping the uncompressed value stored at (4) into an appropriate slab for later re-use, as the uncompressed value need not be further accessed (as being redundant relative to the compressed value thereof stored at (6)). The de-allocated memory location may then be re-used for later writes.

The compressed item will be stored at (6) in a slab of other items having a size that is the same or comparable to the size of the just-compressed item. On the other hand, if the compression at (5) does not significantly reduce the size of the item, the compressed item may be stored in the same slab as the uncompressed version thereof, or another slab storing similarly-sized items.

Figure 6:
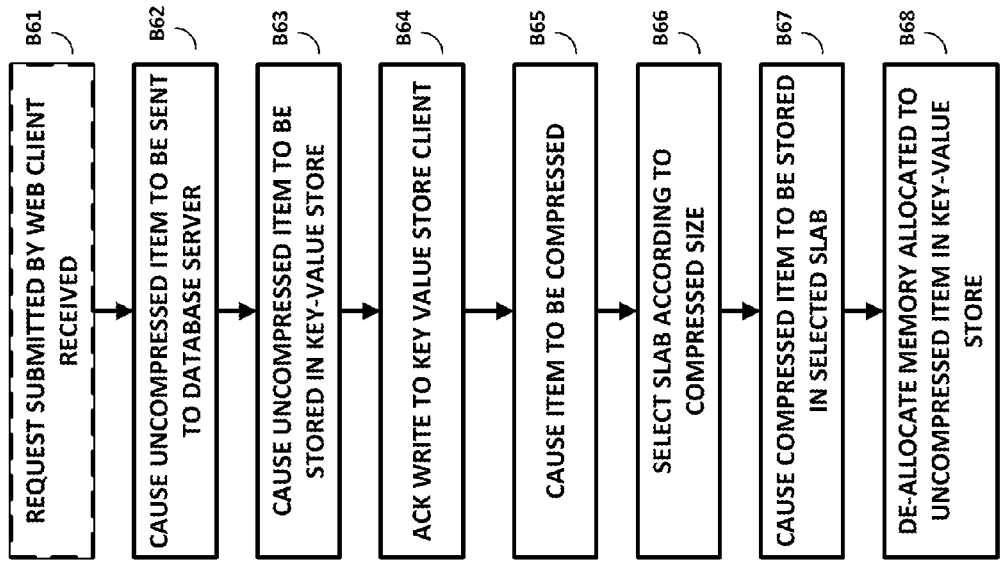
FIG. 6 is a flowchart of a method according to one embodiment.

FIG. 6 is a flowchart of a method according to one embodiment. As shown, Block B61 calls for receiving a request (such as a request to write an item and update database records, for example) by a web client such as shown at 502 in FIG. 5. The uncompressed item may then be sent or caused to be sent for storage in a database server, as shown by Block B62. Block B63 calls for the uncompressed item and an associated key (e.g., the key-value pair as shown in FIG. 3) to be stored or caused to be stored in the key-value store 510 in a slab of items of a size that is comparable to the size of the received uncompressed item. This may be done by logic within the web server 506 that is configured to access and issue a write or writes to the key-value store client 505. The successful write of the uncompressed item to the key-value store may then be acknowledged to the key-value store client, as shown at B64. Sometime later (e.g., not at line rates), the previously-uncompressed item may be compressed, as called for by Block B65. The compression need not take place at a speed and at a timing determined by the servicing of the access requests by the key-value store clients or the web clients. Indeed, the compression shown at (5) in FIG. 5 and in Block B65 may be carried out as a background process. Reads of compressed key-value store items, on the other hand, may be carried out line rates, to reduce to a minimum the latency between the request for the item and the providing thereof. Decompression, therefore, may be configured to occur at retrieval by the database server 508 and/or the key-value store(s) 510, and may be configured to occur at line rates. Comparatively, the latency between a write request and the storing of a compressed version of the item may not be nearly as critical, as the timing thereof need not affect system performance to a similar extent as in the read case. Among other reasons, this is because an uncompressed version of the item is already safely stored in the key-value store (or distributed key-value store in the case wherein multiple key-value stores are provided) and is ready and available for read requests.

As shown at B66, the just-compressed item may be stored in the key-value store 510. To do so, a slab storing items that are similarly sized as the just-compressed item may be selected. The just-compressed item may then be stored in the selected slab, as shown at B67. The memory in the key-value store(s) 510 that was previously allocated for storage of the uncompressed item in Block B63 may now safely be de-allocated (stored in another slab) and made available for later writes, as shown at B68. For example, the uncompressed item may be moved to the tail end of the LRU, which will be dropped from the linked list when another item is subsequently stored in that LRU.

According to one embodiment, when new item values are sent by key-value store clients, they are stored in an uncompressed format, and a flag may be set to identify them these new item values as being uncompressed. A pointer may be added to a hardware queue, such that the uncompressed items may be compressed in the order in which they were received (for example). The uncompressed items may then be compressed by hardware as rapidly as possible (but significantly slower, in one embodiment, than line rate). As the storing of uncompressed items is carried out by hardware without delay, there is no significant latency penalty on write/store requests from key-value store clients. Some items may constitute uncompressible data. In that case, the uncompressed flag remains set and no attempt to decompress the item need be carried out upon a retrieval request from a key-value store client.

If, however, the item is compressible and if the size of the compressed item is less than the uncompressed size thereof, the following may be carried out, according to one embodiment. If the size of the compressed item is indeed less than the uncompressed size thereof, the hardware may pull the correct size buffer off of the LRU tail and copy the compressed item into this buffer. As the hardware knows the size of the items in each LRU, it is able to pull a buffer from an LRU that stores items that are similarly-sized as the compressed item. The hardware may then respond to the software with this result and may move the compressed item to the head of the selected LRU. The software may then replace the original uncompressed item in the hash chain, thereby making that buffer available for later-occurring stores. Upon a retrieval request (read request), the hardware may read the compressed/uncompressed flag and, if the compressed flag indicates that the stored item value is compressed, may decompress the item on the fly before providing the item to the requesting key-value store client.

According to one embodiment, all pointers may be managed by hardware, with the software converting the pointers to virtual space. For example, at least some of the functionality disclosed herein and shown in FIGS. 3-6 may be carried out by, for example, a Peripheral Component Interconnect Express (PCIe) card as shown at 512 in FIG. 5 comprising non-volatile memory and a Floating Programmable Gate Array (FPGA) 514 programmed according to embodiments via, for example, a hardware descriptor language such as Verilog or VHSIC Hardware Descriptor Language (VHDL). The hash table 402 and the previous and next pointers within a slab may also be managed by hardware, which may also comprise functionality to move an item to the head of an LRU or more an item to the tail of an LRU. The hash next pointer may be handled by software or hardware.

According to one embodiment, the hardware may be configured to handle situations in which access and modifications to items stored in the key-value store(s) 510 may cause potential race conditions and manage those exceptions. For example, such a race condition may occur when an adjacent item (e.g., the next or previous item in the LRU) may be independently in the process of being fetched by another request. This would modify the pointer from the item sought to be modified to the next or previous item in the chain. This may occur because the value of the next or previous item in the chain is unknown to the hardware until the memory read has returned the value of the item. In the intervening time, there is the possibility either the next or previous item in the chain is being similarly accessed. Therefore, the modification of next and previous LRU pointers must be carried out in a coherent manner to prevent the linked list of items within a slab from becoming corrupted.

Therefore, on an access, the next item in the LRU chain, the previous item in the LRU chain, the next item from the head and/or the previous item from the tail of the chain must be prevented from being modified. To do this without a locking mechanism, one embodiment implements a "Do Not Access List" of items that must not be accessed until the current access in the pipeline of such access requests has completed. By placing the requisite items on the Do Not Access List, race conditions are avoided. A Do Not Access List is unlikely to be successful in a software implementation, due to locking problems. For example, consider three memory accesses A, B and C. In this scenario, memory access A came first in time, then B and then C. Suppose that memory access A is accessing item X, but that is unknown to the hardware until the value of item X is actually returned. Suppose further that later-occurring (with respect to A) memory access B is also accessing item X. Memory access B may have already started and may have blocked further access to item X, which would prevent earlier-occurring memory access A from accessing item X. As memory access A must take precedence over later-occurring memory access B, which has locked access to that same item, a wrong-order memory contention has occurred. In such and similar situations, all pipelined memory reads are flushed and restarted from an appropriate point. Continuing with the example being developed herewith, a right-order contention situation may arise in the context, for example, memory access A reading item X first, and temporarily blocks access to at least X, the next-adjacent item and the previous-adjacent item. Thereafter, memory access B also accesses item X, the next adjacent item or the previous item and sees that these items are already blocked (i.e., placed on the Do Not Access List). In that instance, there is no need to flush the pipelined reads, as memory access B may simply wait until the requested item is no longer blocked (i.e., is no longer on the Do Not Access List). That is, memory access B may simply wait until memory access A has completed, updated X as needed and removed X from the Do Not Access List. Unlike a locking mechanism that ensures that collisions never happen, placing items on a Do Not Access List does not ensure that collisions do not happen. Instead, the Do Not Access List, according to one embodiment, still allows collisions to occur but provides a streamlined method of recovering from such a collision. Such cases in which pipelined reads are flushed are rare and implementation should not impose undue performance issues.

Figure 7:
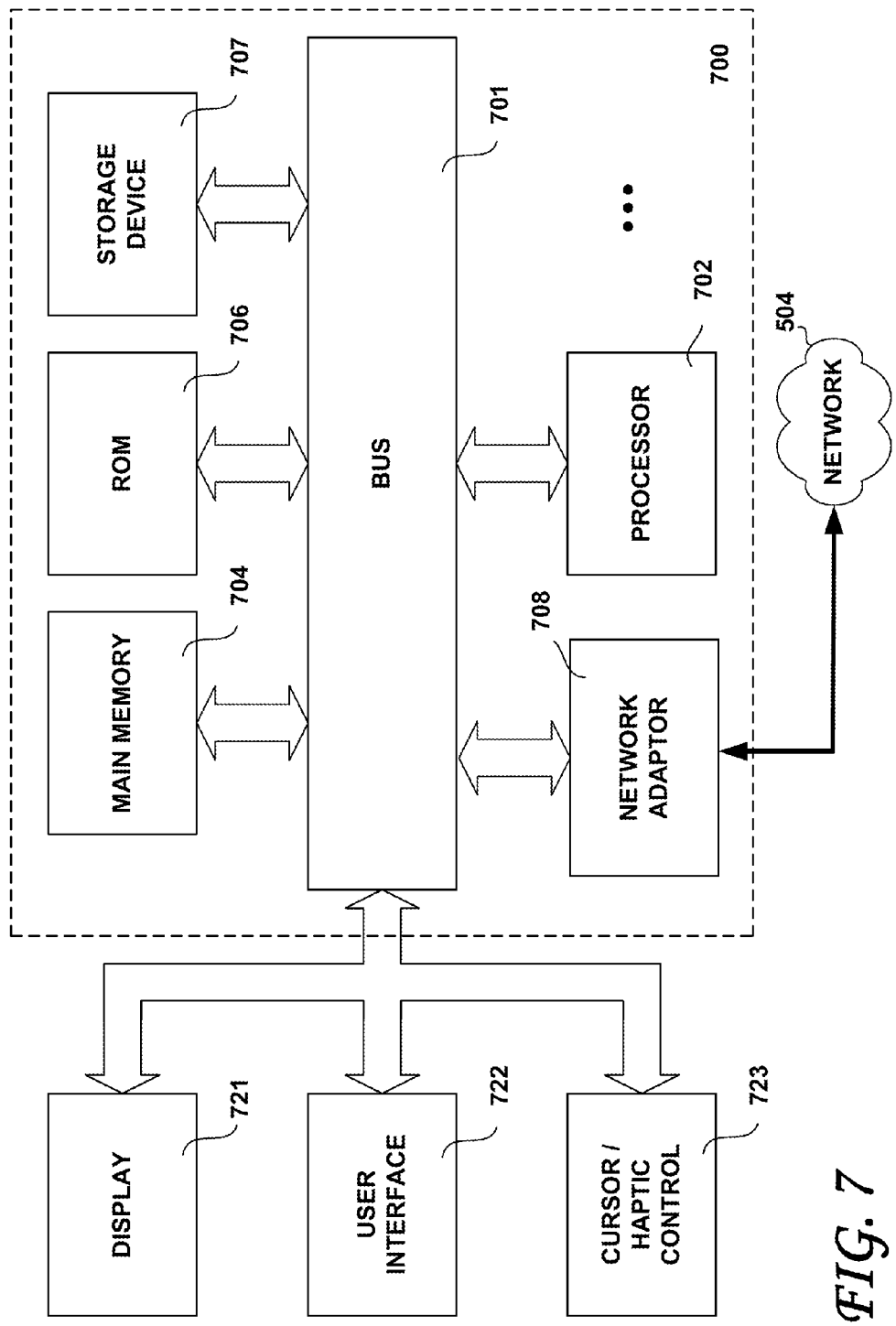
FIG. 7 is a block diagram of a computing device configured to carry out the functionality shown and described herein, according to one embodiment.

FIG. 7 is a block diagram of a computing device or system (e.g., server or other computing device) with which embodiments may be practiced. For example, the architecture shown in FIG. 7 may be present in the web server 506, database server 508 and/or key-value store 510 configured to carry out an embodiment. Computer system 700 includes a bus 701 or other communication mechanism for communicating information, and one or more processors 702 coupled with bus 701 for processing information. Computer system 700 further comprises a random access memory (RAM) or other dynamic storage device 704 (referred to as main memory), coupled to bus 701 for storing information and instructions to be executed by processor(s) 702. Main memory 704 also may be used for storing temporary variables or other intermediate information during execution of instructions by processor 702. Computer system 700 also includes a read only memory (ROM) and/or other static storage device 706 or non-volatile memory 706 coupled to bus 701 for storing or persistent static information and instructions for processor 702. A data storage device 707, such as a magnetic disk and/or solid state storage, may be coupled to bus 701 for storing information and instructions. The computer system 700 may (but need not) also be coupled via the bus 701 to a display device 721 for displaying information to a user. A user interface device 722, including alphanumeric and other keys, may be coupled to bus 701 for communicating information and command selections to processor(s) 702. Another type of user input device is cursor or haptic control 723, such as a touch screen, mouse, a trackball, or cursor direction keys for communicating direction information and command selections to processor 702 and for controlling cursor movement on display 721. A network adaptor 708 may also be coupled to the bus 701 to enable the computer system 700 to communicate with, for example, the network 504 to carry out the functionalities shown and described herein. It should be understood that embodiments result in significant improvements in the speed and performance of key-value storage (an example of which is Memcached) and significant improvements in the functioning of the computing device that implements an embodiment in terms of, for example, its ability to efficiently manage key-value storage and write latencies, as experienced by a key-value store client and/or web clients, for example.

Portions of the detailed description herein describe processes and symbolic representations of operations by computing devices that may include conventional computer components, including a local processing unit, memory storage devices for the local processing unit, display devices, and input devices. Furthermore, such processes and operations may utilize conventional computer components in a heterogeneous distributed computing environment including, for example, remote file servers, computer servers, and memory storage devices. These distributed computing components may be accessible to the local processing unit by a communication network such as shown at 504. The processes and operations performed by such computing devices include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. A process or computer-implemented method may generally be defined as comprising a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should be understood that manipulations within the computer are often referred to in terms such as adding, comparing, moving, positioning, placing, illuminating, removing, altering, etc., which are often associated with manual operations performed by a human operator. The operations described herein are machine, programmatic operations performed in conjunction with various input provided by a human operator or user that interacts with the computer. The machines used for performing the operation of the present invention include local or remote general-purpose digital computers or other similar computing devices. In addition, it should also be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic (such as FPGA 514) or programs stored in nonvolatile memory, such as read only memory.

What is claimed is:

1. A computer-implemented method of storing data items, comprising:
   receiving a data item for storage from a client process of a key-value client process over a computer network;
   sending the data item to a database server for storage as an uncompressed data item and setting a flag indicating that the data item is not compressed;
   storing the uncompressed data item as a first key-value pair in a key-value store;
   without delay attributable to compressing the received data item, acknowledging to the key-value client process by the key-value store that the uncompressed data item has been stored in the key-value store;
   compressing, by a compression process in the key-value store, the stored uncompressed data item to create a compressed data item, wherein the compression does not take place at a speed and at a timing determined by servicing of access requests made by a plurality of key-value store clients or the client process;
   storing the compressed data item as a second key-value pair in the key-value store;
   deallocating a memory location in the key-value store used to store the uncompressed data item; and
   upon receiving a retrieval request for access to the data item from one of the plurality of key-value client processes over the computer network, reading the flag and if the flag indicates that the stored data item is compressed, decompressing the compressed data item before providing the decompressed data item to the requesting key-value client process over the computer network.

2. The computer-implemented method of claim 1, further comprising:
   when storing the uncompressed data item is stored and setting the flag indicating that the data item is not compressed, adding a pointer to a hardware queue, such that uncompressed data items are compressed in an order in which the uncompressed data items are received by hardware at a rate significantly slower than a line rate.

3. The computer-implemented method of claim 1, further comprising responsive to the data item comprising uncompressible data, maintaining the setting of the flag so that no attempt to decompress the data item is made upon receiving any request for access to the data item.

4. The computer-implemented method of claim 1, wherein storing the received the data item and the compressed data item comprises selecting a slab of a plurality of slabs in which to store the received data item and the compressed data item, at least some of the plurality of slabs being configured to store data items of similar size.

5. The computer-implemented method of claim 3, further comprising storing the data item in a particular slab of similarly-sized items ordered in a Least Recently Used (LRU) list.

6. The computer-implemented method of claim 4, further comprising:
responsive to a size of the compressed data item being less than a size of the uncompressed data item, selecting a similarly sized buffer off a tail of the LRU and coping the compressed data item into the buffer; and
moving the selected buffer comprising the compressed data item to a head of the LRU.

7. The computer-implemented method of claim 1, wherein compressing and storing the compressed data item are carried out as a background process.

8. The computer-implemented method of claim 1, wherein storing the received data item and the compressed data item also comprise storing the received data item and the compressed data item in a cache from which subsequent access requests to the data item may attempt to be serviced.

9. The computer-implemented method of claim 8, wherein the cache comprises a key-value pair store.

10. The computer-implemented method of claim 1, wherein items stored in the key-value stored are stored in at least one linked list of items.

11. The computer-implemented method of claim 10, further comprising temporarily placing at least one data item in the linked list on a Do Not Access List.

12. The computer-implemented method of claim 11, further comprising selectively flushing a pipeline of access requests when an access request would cause a race condition with at least one data item in the Do Not Access List.

13. A computing device configured as a key-value store, comprising:
at least one processor;
at least one data storage device coupled to the at least one processor and configured to store a plurality of processes spawned by the at least one processor, the processes including processing logic for:
receiving a data item for storage from a client process of a key-value client process over a computer network;
sending the data item to a database server for storage as an uncompressed data item and setting a flag indicating that the data item is not compressed;
storing the uncompressed data item as a first key-value pair in a key-value store;
without delay attributable to compressing the received data item, acknowledging to the key-value client process by the key-value store that the uncompressed data item has been stored in the key-value store;
compressing, by a compression process in the key-value store, the stored uncompressed data item to create a compressed data item, wherein the compression does not take place at a speed and at a timing determined by servicing of access requests made by a plurality of key-value store clients or the client process;
storing the compressed data item as a second key-value pair in the key-value store;
deallocating a memory location in the key-value store used to store the uncompressed data item; and
upon receiving a retrieval request for access to the data item from one of the plurality of key-value client processes over the computer network, reading the flag and if the flag indicates that the stored data item is compressed, decompressing the compressed data item before providing the decompressed data item to the requesting key-value client process over the computer network.

14. The computing device of claim 13, wherein the processes are further configured to:
when storing the uncompressed data item and setting the flag indicating that the data item is not compressed, adding a pointer to a hardware queue, such that uncompressed data items are compressed in an order in which the uncompressed data items are received by hardware at a rate significantly slower than a line rate.

15. The computing device of claim 13, wherein responsive to the data item comprising uncompressible data, maintaining the setting of the flag so that no attempt to decompress the data item is made upon receiving any request for access to the data item.

16. The computing device of claim 13, wherein storing the received the data item and the compressed data item comprises selecting a slab of a plurality of slabs in which to store the received data item and the compressed data item, at least some of the plurality of slabs being configured to store data items of similar size.

17. The computing device of claim 16, wherein storing the data item in a particular slab of similarly-sized items ordered in a Least Recently Used (LRU) list.

18. The computing device of claim 17, wherein the processes are further configured to:
responsive to a size of the compressed data item being less than a size of the uncompressed data item, selecting a similarly sized buffer off a tail of the LRU and coping the compressed data item into the buffer; and
moving the selected buffer comprising the compressed data item to a head of the LRU.

19. The computing device of claim 13, wherein the processes are further configured to compress and store the compressed data item as a background process.

20. The computing device of claim 13, wherein storing the received data item and the compressed data item also comprise storing the received data item and the compressed data item in a cache from which subsequent access requests to the data item may attempt to be serviced.

21. The computing device of claim 20, wherein the cache comprises a key-value pair store.

22. The computing device of claim 13, wherein items stored in the key-value stored are stored in at least one linked list of items.

23. The computing device of claim 22, further comprising temporarily placing at least one data item in the linked list on a Do Not Access List.

24. The computing device of claim 23, wherein the processes are further configured to selectively flush a pipeline of access requests when an access request would cause a race condition with at least one data item in the Do Not Access List.

* * * * *